Jan. 17, 1967  R. J. SCHAEDLER ETAL  3,298,481
TORQUE RELEASE AND SHUT OFF DEVICE FOR ROTARY PNEUMATIC TOOLS
Original Filed Oct. 1, 1959  4 Sheets-Sheet 1
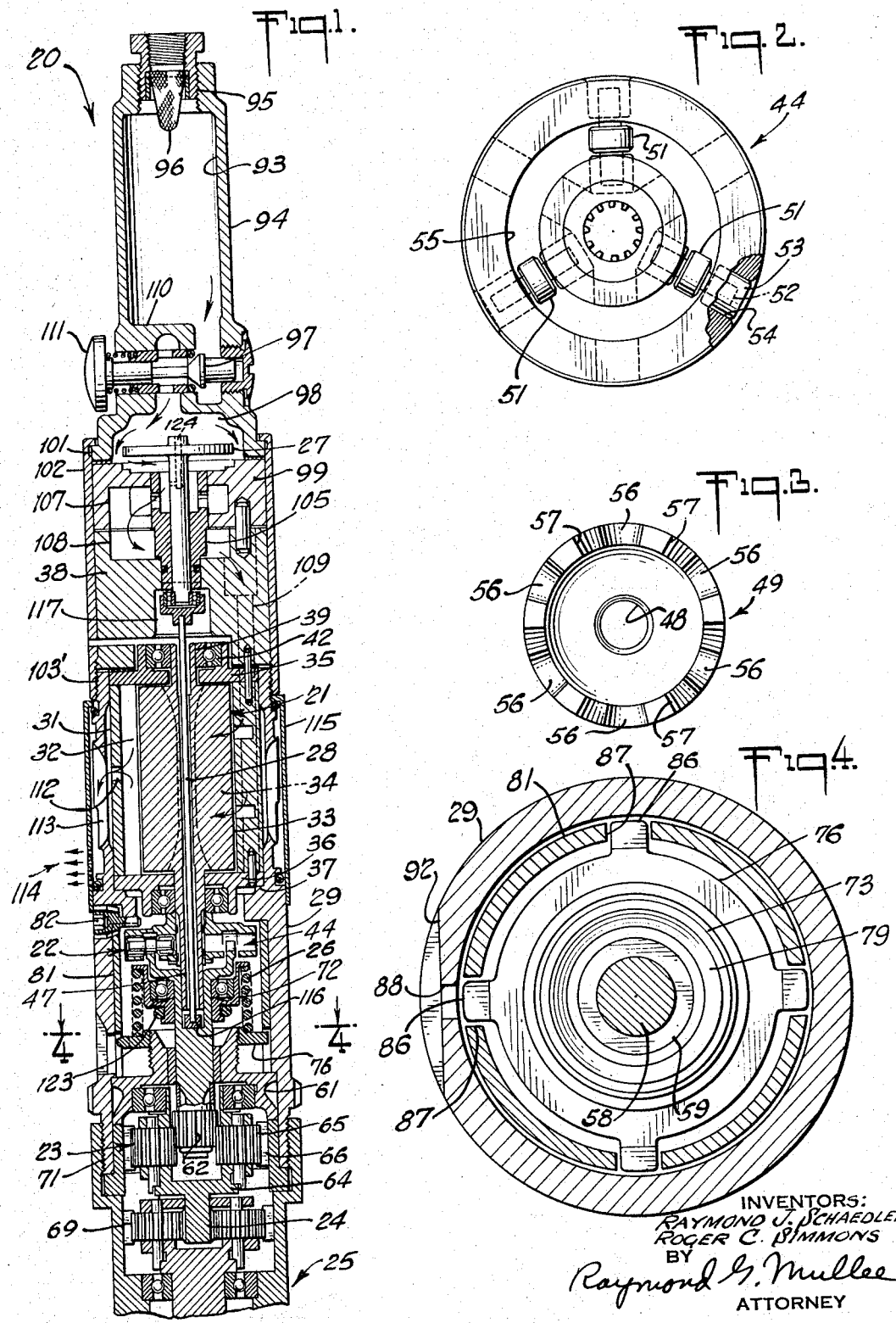
INVENTORS:
RAYMOND J. SCHAEDLER
ROGER C. SIMMONS
BY
Raymond G. Mullee
ATTORNEY

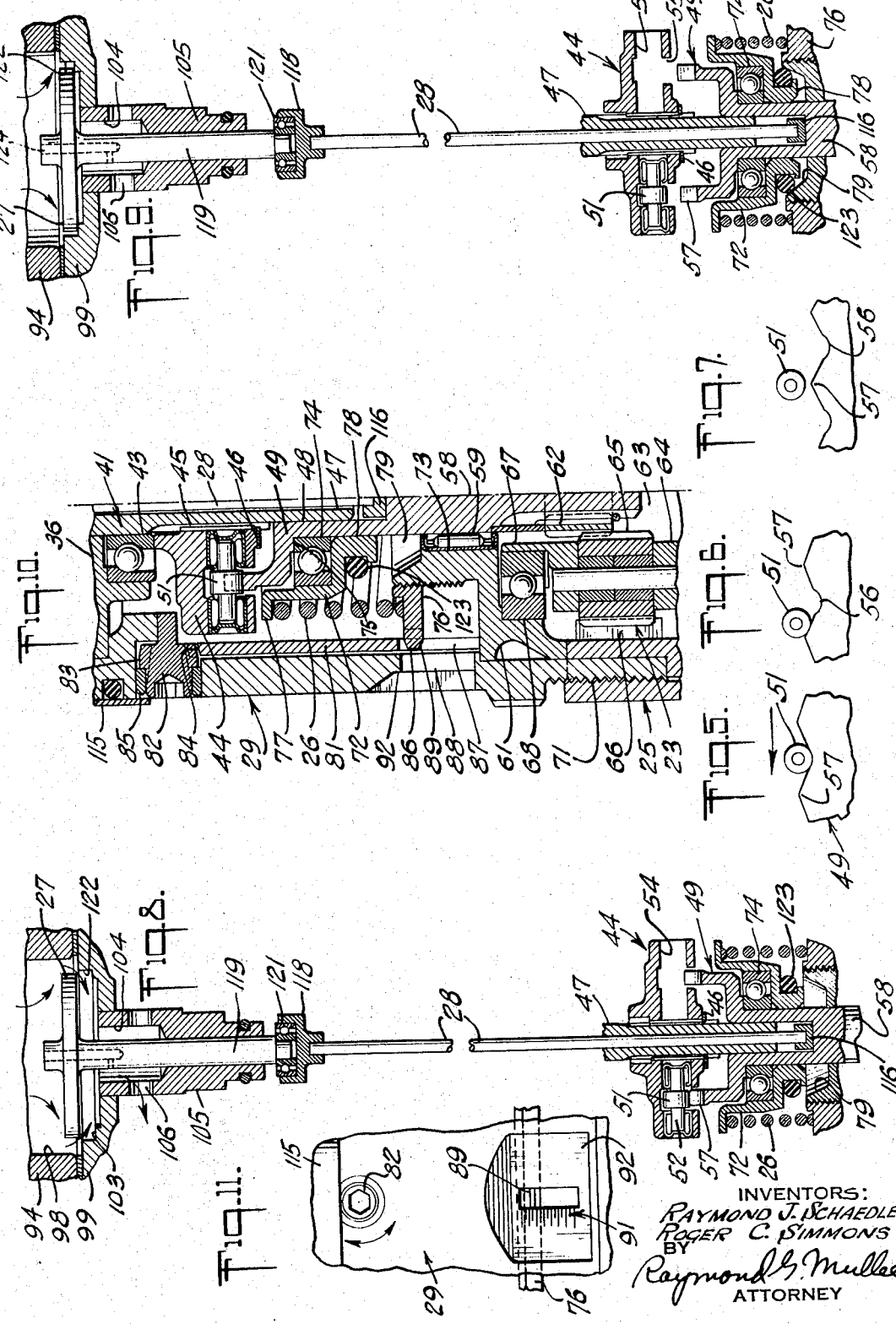

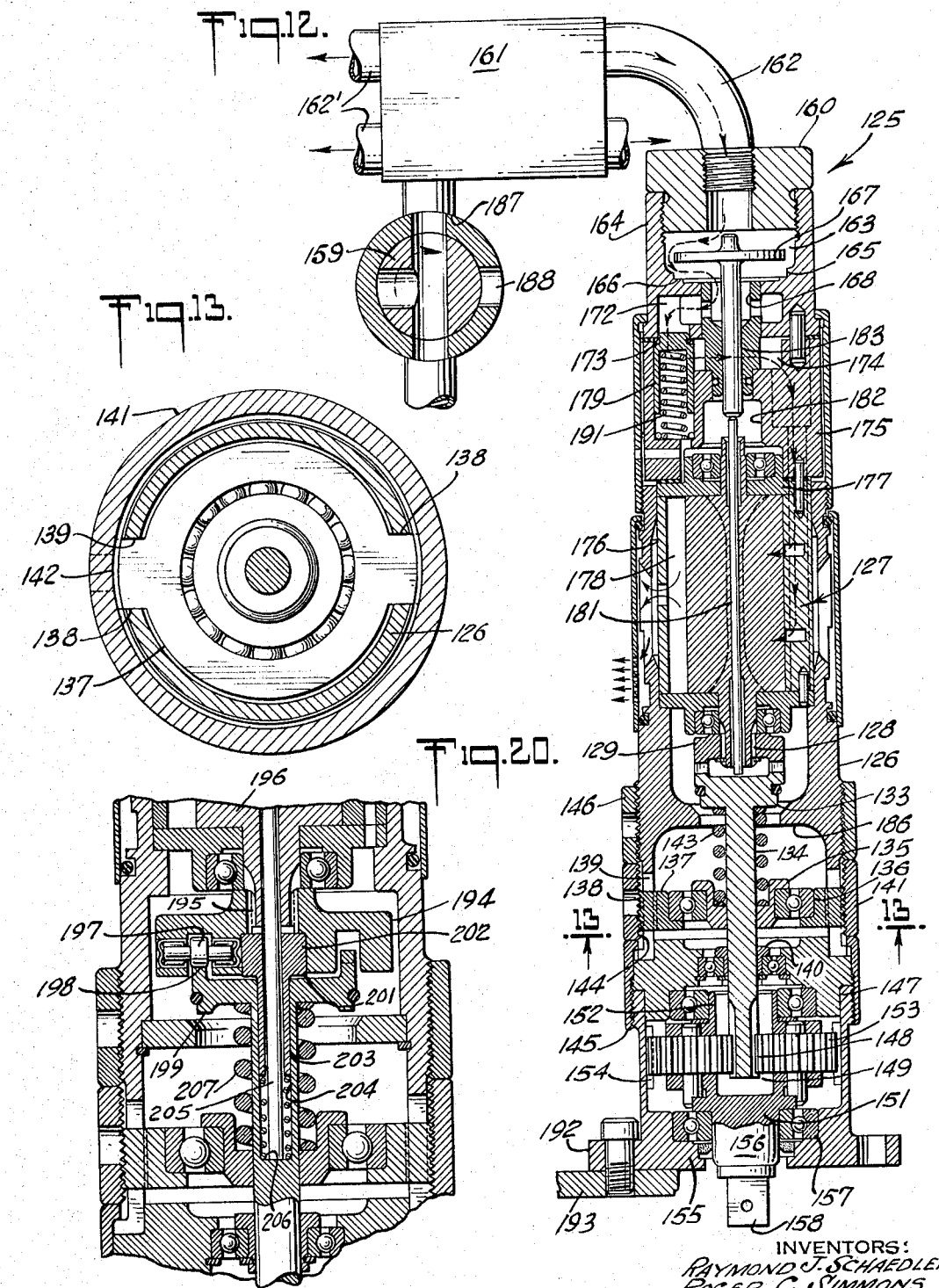

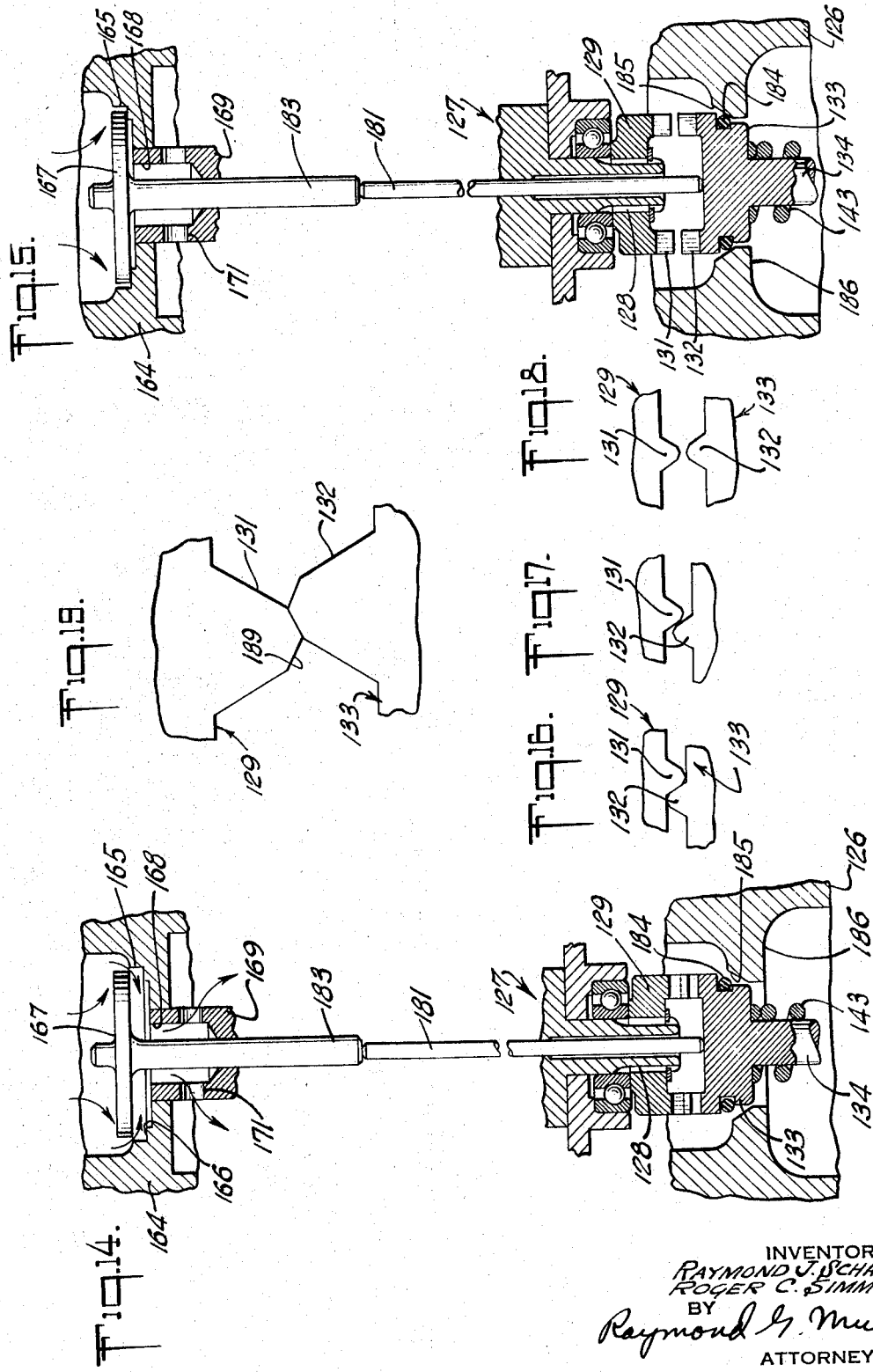

United States Patent Office 3,298,481
Patented Jan. 17, 1967

3,298,481
TORQUE RELEASE AND SHUT OFF DEVICE FOR ROTARY PNEUMATIC TOOLS
Raymond J. Schaedler and Roger C. Simmons, Utica, N.Y., assignors to Chicago Pneumatic Tool Company, New York, N.Y., a corporation of New Jersey
Continuation of application Ser. No. 843,704, Oct. 1, 1959. This application July 10, 1963, Ser. No. 295,286
43 Claims. (Cl. 192—.034)

This application is a continuation of our pending application Serial No. 843,704, filed October 1, 1959, now abandoned.

This invention is concerned with a pneumatically powered non-impacting tool for transmitting controlled torque to a driven element such as a nut, bolt or screw.

The tool of the present invention includes a pneumatically powered motor which acts through a spring loaded clutch to deliver torque to a work spindle.

A feature of the invention lies in desirable means whereby the clutch is adapted to be fully disengaged, and pneumatic power to the motor is caused to be simultaneously cut off with the latter action when a predetermined torque load is realized by the spindle.

A further feature of the invention is provided by means which acts to abruptly separate one clutch member axially and clear of the other when the torque limit of the spindle is reached. This feature avoids certain problems associated with the usual spring type clutch. These problems result from the fact that the compression spring exerts a holding force tending to engage the clutch members at all times. Because of this tendency the engaging portions of the clutch teeth are subjected to excessive wear, not only in the step of separating under load but especially after the clutch teeth have been disengaged and are moved into re-engagement under the force of the spring. The re-engagement and disengagement continue in rapid succession between the time that the clutch first releases and the time that the operator cuts off the rotary power thereto; and during this interval the clutch operates with a series of impacts or rotary hammer blows. This impacting or ratcheting operation occurs under heavy spring pressure and has the undesirable effects of tightening the driven bolt beyond the predetermined torque, shortening the life of the clutch parts which are subjected to shocks, and of altering the shape of the engaging parts of the clutch teeth to disturb any adjustment for predetermined torque.

A still further feature of the invention is associated with the torque adjusting means whereby the latter may be visibly and accurately adjusted from the outside of the tool.

A further advantageous feature of this invention lies in the arrangement of a torque release clutch between a motor and a reduction gearing assembly whereby the torque of the motor is transmitted through the clutch to the reduction gearing assembly. This enables the clutch to rotate at the same rate of speed as the motor, whereby reduction in the speed of the motor is obtainable by adding selective reduction gearing assemblies to the clutch according to the work load desired of the tool without disturbing or making alterations of size or weight in the clutch. These advantages are not possible in conventional tools wherein a torque control clutch is arranged at the driven end of the reduction gearing.

An object of the invention is to relieve the clutch members of the engaging spring pressure after they have started to move apart, and thereby prevent excessive wear of the clutch teeth which usually occurs when they move from partly separated to completely separated condition under increasing spring pressure.

Another object is the provision of pneumatic pressure under control of a valve which is responsive to partial separation of the clutch members to overcome the spring holding force and thereby complete the disengagement of the clutch independently of the cam action of the clutch teeth.

A further object is to separate the clutch members by a distance greater than could be attained from the camming action of the teeth.

Still another object is to hold the clutch members disengaged until the operator intervenes to recycle the tool, whereby the driven element of the clutch is relieved of all torque until the operator first closes and then re-opens the throttle valve.

The invention has particular, though not exclusive, application to gang torque machines for nut setting or screw driving operations in which a plurality of tools are started simultaneously and each tool stops independently of the others when a predetermined torque is attained, whereupon each clutch is locked out and each motor stopped, after which the operator intervenes to re-engage all clutches simultaneously and later to start all motors simultaneously.

The foregoing and other objects and advantages of this invention will appear more fully hereinafter from a consideration of the detailed description which follows, taken together with the accompanying drawings wherein three embodiments of the invention are illustrated.

In the accompanying drawings:

FIG. 1 is a longitudinal section through a hand-held tool embodying the invention;

FIG. 2 is an enlarged detail of the underface of the upper clutch member;

FIG. 3 is a detail of the upper face of the lower clutch member;

FIG. 4 is a section taken on line 4—4 of FIG. 1;

FIGS. 5, 6 and 7 are respectively developed views of a clutch roller in full engagement with a clutch pocket; in partial disengagement; and in full disengagement;

FIG. 8 is a detail showing the poppet valve in partially closed condition and the associated clutch members in partial disengagement;

FIG. 9 is a detail showing the poppet valve fully seated or closed and the associated clutch members fully separated;

FIG. 10 is a detail showing the mechanism for adjusting the spring load of the clutch, and also showing some of the adjoining parts;

FIG. 11 is a detail of the torque setting indicia;

FIG. 12 is a longitudinal section of a modified form of a tool embodying the invention;

FIG. 13 is a section on line 13—13 of FIG. 12;

FIG. 14 is a detail showing the poppet valve of FIG. 12 partially closed and the associated clutch members partially disengaged;

FIG. 15 is a detail showing the poppet valve of FIG. 12 fully seated or closed and the associated clutch members fully disengaged;

3

FIGS. 16, 17, and 18 are respectively developed views showing the clutch members of FIG. 12 fully engaged, partially disengaged, and fully disengaged;

FIG. 19 is an enlarged developed view showing the clutch members partly re-engaged; and FIG. 20 shows a detail of a further modified form of the clutch mechanism.

Attention is now directed particularly to FIGS. 1–11, wherein is shown a tool 20 adapted by means of an air powered motor unit 21 to transmit torque power through a spring loaded clutch unit 22 and reduction gearing 23 to a spindle 24 connected with an adapter or sub-assembly 25, partially shown, and arranged for attachment to a nut, screw or other torque driven device (not shown). When the resistance of the work to rotation by the spindle exceeds a predetermined value greater than the force holding the clutch engaged, the clutch is adapted to disengage axially against the load of its spring 26. Responsive to this disengaging action, a pneumatically operated shut-off or poppet valve 27 acts to cut off operating air flow to the motor and at the same time acts through a thrust or slide rod 28 to fully disengage the clutch and to hold it in such condition until the operator intervenes. Recycling means under control of the operator is also provided for restoring the shut-off or poppet valve 27 to normal and, as a consequence, effecting re-engagement of the clutch for a repeat operation. Adjustment means is provided in the tool to enable the operator to predetermine the torque setting at which the clutch will disengage to interrupt transmission of further torque power to the spindle.

The tool 20 comprises an elongated casing defined by a succession of housing sections connected in end to end relation. The casing includes a motor-clutch housing 29 in which the motor and clutch units are housed. The motor unit 21 is of conventional type, as shown for example in Maurer U.S. Patent 2,543,979. It includes a liner 31 defining a chamber 32 in which a pneumatically powered rotor 33 is eccentrically arranged. The rotor has the usual radially slidable blades 34 which sweep the wall of the liner as the rotor rotates. Opposite ends of the rotor bear against end plates 35 and 36 which seal over opposite ends of the liner and the rotor chamber. The lower end plate 36 abuts an internal shoulder 37 of the housing 29, and the upper end plate 35 abuts the underside of an air flow block 38. The rotor is supported for rotation by opposite shaft ends 39 and 41 (FIG. 10) thereof which are journaled in bearings 42 and 43 fitted in recesses of bossed ends of the end plates 35 and 36. The lower shaft end 41 of the rotor extends through the bearing 43 and is fixed axially to an upper driving member 44 of clutch 22 (FIGS. 1, 8–10) by means of straight splines at 45 so that this part of the clutch rotates as a unit with the rotor. Clutch member 44 is restrained against rearward axial movement by the inner race of bearing 43, and against forward movement by a retainer ring 46, mounted in an annular groove in the rotor shaft 41. An extended lower portion 47 of rotor shaft 41 depends with a slide fit partway into a cylindrical axial recess 48 formed in a lower driven separable member 49 of the clutch. This lower portion 47 of the rotor shaft serves as a guide for axial sliding movement of the lower clutch member 49 relative to the upper clutch member 44.

The upper clutch member 44 has incorporated therein (FIGS. 1, 2, and 8–10) a plurality of rollers 51, here, three in number spaced 120 degrees apart. Each roller has axial pin ends 52 which are rotatably borne in bearings 53 in a radial bore 54 formed in the body of the clutch member. Each roller rotates in an annular channel 55 which opens through the underface of the upper clutch member. The rollers are adapted to seat or engage in shallow arcuate pockets 56 (FIGS. 1, 3 and 5–10) formed in the opposite face of the lower clutch member 49. These pockets, here, six in number, are spaced equally apart about the face of the lower clutch member. Connecting each pocket with the next adjacent pocket is a tooth cam 57. The peak of this tooth cam has a height, when measured from the bottom of the pocket, which is equal to the radius of a roller 51. The clutch members 44 and 49 are held normally in clutched engagement by means of the load of the spring 26 for rotation as a unit. The teeth of the lower clutch member project freely into the channel 55 of the upper clutch member.

Integral with the lower clutch member is a reduced cylindrical axially depending shaft 58. This shaft passes with a slide fit through a guide bearing 59 fitted axially of an annular bearing block 61. The latter has a fixed position in the lower end of the motor-clutch housing. A drive gear 62 fixed on the free end of the clutch shaft is freely disposed in an axial recess 63 of a reduction gearing spindle cage 64, wherein the drive gear has a sliding straight spline driving engagement with idler gears 65 supported in the cage. The idler gears in turn engage a fixed ring gear 66 secured to the motor-clutch housing. The spindle cage has an upper hollow shaft end 67 supported for rotation in a bearing 68 fitted in the bearing block 61. A lower axial end of the spindle cage defines the spindle 24 which is adapted for driving engagement with gearing 69 of the adapter 25. The lower end of the motor-clutch housing is provided with peripheral threads 71 enabling attachment of the adapter 25, or other sub-assembly gearing.

Rotation of the motor 21 is transmitted through the spring loaded clutch 22 and the spindle 24 to the adapter 25 and the associated driven element, not shown, to be tightened. When the resistance of the driven element to further tightening reaches a predetermined value, the load of the clutch spring 26 is overcome, causing the lower clutch member 49 to be cammed axially out of engagement from the upper clutch member 44. Means is provided for adjusting the load of the clutch spring, and thereby predetermining the torque value at which the clutch members will automatically disengage. To this end, a spring cup 72 (FIGS. 1 and 10) sleeves with a slide fit the clutch shaft 58 above a threaded boss 73 of the bearing block 61. Seated in the spring cup is a bearing 74, the inner race of which bears upon the clutch shaft, and the upper end of which abuts a shoulder 75 of the lower clutch member. The shaft 58 of the lower clutch member has rotative movement relative to the spring cup 72 and axial movement as a unit with the latter. The clutch spring 26 is compressed or loaded between the flat face of an axially adjustable nut 76 threaded upon the boss 73 and a peripheral flange 77 of the spring cup. The load of the clutch spring acts through the spring cup 72 and bearing 74 to hold the lower clutch member in clutched engagement with the upper clutch member. In this normal condition of the clutch, a depending reduced bottom end 78 of the spring cup has a spaced relation to the boss member 73, and is adapted to be received into a conical recess 79 of the latter when the lower clutch member is moved axially downward. The load of the clutch spring acting upon the lower clutch member may be adjustably relaxed or increased accordingly as the adjustable nut 76 is threaded axially up or down upon the boss member 73.

Means (FIGS. 1, 4 and 10) is provided to enable adjustment of the nut 76 from the outside of the tool. To this end, an open-ended sleeve or barrel 81 adjacent the smooth internal wall of the motor-clutch housing 29 bears at its bottom end upon the smooth flat surface of the bearing block 61. This barrel is rotatable relative to the housing 29 and to the bearing block 61 by means of a pinion member 82. The latter is rotatably mounted in a bore in the side wall of the housing 29, and has a bevel gear portion 83 projecting into the housing and drivingly engaged with a complementary ring of teeth 84 formed about the upper edge of the barrel. The pinion member is operable by means of a hexagonal key (not shown) insertable into a correspondingly shaped socket of the pinion member. A bushing 85 press fitted into the housing serves as a bearing for the pinion member and retains the latter in the wall of the motor-clutch housing. The adjustable nut 76 has a plurality of splines or ears 86, here four, (FIG. 4) extending radially from its periphery and spaced circumferentially equally apart. Each ear projects with a slide fit into an individual elongated vertical slot 87 formed in the lower end of the barrel 81. By this arrangement, as the pinion member 82 is rotated one way or the other, the barrel turns accordingly and carries the ears 86 of the adjustable nut with it, thus causing rising or lowering of the nut in the slots 87 according to the direction of the turning, and thus causing a consequent increase or decrease in the load of the clutch spring 26. The slots 87 are successively registrable upon each quarter turn of the adjustable nut with a complementary slot 88 which opens through the wall of the motor-clutch housing. The end of each ear is slightly tapered as at 89. Indicia 91 (FIG. 11) upon a rcessed outer wall 92 of the motor-clutch housing about the slot 88 is readable against the elevated position of the tapered end 89 of any of the ears 86 brought into register with slot 88. By this means the torque setting of the clutch can be accurately preset and easily adjusted, as desired, from the outside of the tool.

Pneumatic power to drive the motor is provided through a flexible supply hose line, not shown, adapted to be connected to a source of pressure air. The hose line connects with an enlarged chamber 93 (FIG. 1) of a hollow handle 94 by means of an adapter 95 threaded into an open end of the handle. A filter 96 for cleaning the intake air is incorporated in the adapter. The chamber 93 communicates through a throttle valve 97 (shown in open condition) with a poppet valve chamber 98. The latter is defined by a recessed bottom end of the handle, and is disposed above an adjacent poppet valve block 99. The latter at its top end abuts a peripheral foot flange 101 of the handle and at its bottom end abuts the air flow block 38. A sleeve nut clamp 102 sleeving over the blocks 38 and 99 and the foot flange 101 of the handle is tightly threaded at 103' to the upper end of the motor-clutch housing 29, whereby housing sections 94, 99, 38 and 29 are secured fast to one another in end to end relation.

The poppet valve block 99 provides (FIGS. 1, 8 and 9) for the poppet valve 27 a recessed valve seat 103 about an axial opening 104 formed in the upper end of a valve guide bushing 105. The latter is fixed axially of blocks 99 and 38. The opening 104 communicates through radial ports 106 of the bushing with annular recesses 107 and 108, and passage means 109 leading through the liner 31 to the rotor chamber 32.

The throttle valve 97 is manually depressible, and is spring loaded in suitable manner for return movement. It is slidably supported in an internal boss 110 of the handle. It controls flow of operating air from the handle to the poppet valve chamber 98. The throttle valve is shown in FIG. 1 in opened condition. It is opened by manually depressing an external end button 111 thereof, whereupon pressure air flows through the associated passages to drive the rotor. Spent air from the rotor chamber exhausts through a liner port 112 and and through a larger port 113 of the motor-clutch housing. After leaving the latter port the spent air vents to atmosphere through a plurality of five ports at 114 of an exhaust deflector or jacket 115 surrounding the motor-clutch housing. The ports at 114 deflect the spent air in a radial direction from the tool so as to prevent the air from blowing in the operator's face.

As earlier explained, the lower clutch member 49 is adapted to disengage axially from the upper clutch member 44 when the torque setting is reached. Responsive to this disengaging action, means is provided to fully separate the lower clutch member from the upper member and to hold it in separated condition, thereby preventing re-engagement which might results in an undesirable impacting or ratcheting action.

This re-engagement preventing means is incorporated (FIGS. 1, 5–10) in the tool, and includes in association with the poppet valve 27 the cylindrical thrust rod 28. The latter extends with a slide fit axially through the body of the rotor and through both shaft ends thereof. The lower end of the thrust rod projects below the lower end portion 47 of the rotor shaft 41 into recess 48 of the lower clutch member, wherein it is seated in a cylindrical cup or button 116. The button has a slide fit in the recess 48. The lower clutch member is capable of rotary movement relative to the button, and to the associated thrust rod. The upper end of the thrust rod projects into a vented recess 117 (FIG. 1) at the underside of the flow block 38. Seated on the upper end of the thrust rod is a bearing cup 118. The poppet valve has a cylindrical stem 119 depending axially from its underside. This stem extends freely through the opening 104 of the bushing 105, and extends with a slide fit through the lower portion of the bushing. Below the bushing 105 the free end of the stem of the poppet valve is fitted in the inner race of a bearing 121 seated in the bearing cup 118, whereby the bearing cup is capable of rotary movement relative to the stem 119. Should any rotation of the rotor and clutch be imparted to the thrust rod 28, the bearing 121 serves to allow the thrust rod to rotate relative to the poppet valve 27 so as to avoid transmission of rotation of the rotor to the latter and resultant wear of the stem 119 of the poppet valve in the bushing 105.

The upper surface of the poppet valve 27 comprises an inner area and an outer area both exposed to full line pressure as long as the throttle valve 97 is open. The inner area, which corresponds to the cross sectional area of stem 119, is always unbalanced or unopposed because the lower end of the stem is always exposed to atmospheric pressure. The outer area may be balanced, more or less, depending on the position of the valve, by the area on the underside of the head of the valve surrounding the stem. In the FIG. 1 position of the valve the pressure over the outer area at the top is opposed and balanced, or nearly balanced, by the air pressure below the head with the result that the top pressure is effective only over the inner area corresponding to that of stem 119. This inner or constantly effective area is relatively small so that the unbalanced downward pressure on the valve is normally insufficient to overpower the spring 26. However, the total area at the top of valve 27 is sufficient so that when it is unbalanced, as will be described later, it overpowers the spring 26.

The poppet valve 27 has a normal condition, wherein it is held elevated by means of the thrust rod 28 clear of its seat 103 and of a surrounding shoulder 122 when the clutch is fully engaged, as appears in FIG. 1. The normal elevated distance of the poppet valve from its seat is a little greater than the depth of the roller pockets 56 of the lower clutch member 49. This depth is measured from the peaks of the cam teeth 57 to the bottom of the pockets 56. By this arrangement, when the poppet valve is caused to be fully seated, in a manner as will now be explained, the lower clutch member will be caused to move axially clear of the upper clutch member.

In the operation of the tool, the throttle valve 97 is manually depressed against its spring load to open condition. Pressure air then flows to the poppet valve chamber, about both faces of the poppet valve, and through the associated passages to rotate the rotor. At first, the shaft 58 of the lower clutch member rotates in unison with the rotor, because the axial component of the reactive force of pockets 56 on the rollers 51, which is directly proportional to the torque being delivered, is insufficient to overcome the holding force of the clutch spring 26, even through the declutching component is augmented by the unbalanced downward air pressure on the poppet valve 27. As the predetermined torque setting is reached by the spindle, however, the lower clutch member 49 is cammed against the load of the clutch spring 26 through the action of the roller elements 51 against the opposing teeth 57 axially away from the upper clutch member. In this movement, the spring cup 72 moves down as a unit with the lower clutch member, and the lower end of the clutch shaft 58 carries the straight splined driving gear 62 slidably down to a lower point of engagement with the idler gears 65. The poppet valve 27 and thrust rod 28 under pressure of air in the poppet valve chamber 98 slidably follow as a unit the axial movement of the lower clutch member. After the roller elements 51 of the upper clutch member 44 have climbed out of the pockets 56 of the lower clutch member 49, a condition of partial disengagement is reached, as appears in FIGS. 6 and 8. In this condition the peripheral lower edge of the poppet valve 27 is in close proximity to the upper peripheral edge of the annular shoulder 122 as defined by the recessed valve seat 103, thereby restricting the annular passage through which the live air is flowing rapidly; whereupon the air pressure per unit area at the underside of the poppet valve is suddenly decreased relative to that pressing over the upper surface of the poppet valve. When the latter condition is reached, the poppet valve 27 acts through the thrust rod 28 to push or thrust the lower clutch member 49 with increasing force away from the upper clutch member.

From the foregoing description it is seen that the resultant of the (spring minus air) pressures holding the clutch members 44 and 49 in engagement is constant until the camming force starts to overcome the holding forces, but that the combined holding force diminishes abruptly after the clutch members start to disengage. This action is the opposite of the usual arrangement in which the clutch members are held engaged solely by a spring which increases its pressure upon partial separation. The advantage of reducing the holding force is to prevent wear on the clutch, which usually happens after separating action has started and while the clutch members are passing over each other under increasing pressure. As the annular passageway around the outer edge of the poppet valve 27 becomes further restricted, the downward preponderance of pressure on the valve reduces the effectiveness of the clutch holding force to zero and then overpowers the spring 26 to reverse the action of the holding force and convert it into a separating force. The result is that the lower clutch member 49 continues its downward movement without the benefit of any continued cam action and for an axial distance greater than that which could be produced by cam action alone, thus obviating the danger of reengagement of the clutch when the roller 51 arrives at the crest of the succeeding tooth 57.

The separating movement of the lower clutch member 49, along with thrust rod 28 and poppet valve 27 continues at a rapid speed until the poppet valve strikes the seat of 103. Such seating action of the poppet valve cuts off operating air flow to the motor 22. Pressure of air continually flowing from the handle to the poppet valve chamber 98 holds the poppet valve seated. The distance the poppet valve drops from its elevated position to its fully seated position is enough to carry the lower clutch member 49 to a fully disengaged position, as in FIGS. 7 and 9. When the lower clutch member is suddenly thrust downward, it carries the spring cup 72 with it, whereupon the reduced bottom 78 of the latter descends into the conical recess 79 of the boss member 73 of the bearing block 61. In this action an O-ring 123 seated in a groove about the bottom end 78 of the spring cup snubs against the conical inner surface of the recess 79. This snubbing action serves to cushion downward movement of the lower clutch member, and also provides a drag or holding check on the lower clutch member so as to prevent rebounding action thereof against the thrust rod. The snubbing action occurs as the O-ring is lightly squeezed between the conical surface 79 and the part 78 of the spring cup.

As long as the throttle valve 97 is held open, the parts remain in the position shown in FIGS. 7 and 9, with the clutch disengaged and the motor at rest. In order to recycle the tool and start a new operation the operator must first close and then re-open the throttle valve 97. When the throttle valve is released to closed condition, air trapped in the poppet valve chamber 98 vents through a restricted passage 124 in the poppet valve stem 119 to the air flow passages 107, 108, 109 leading to and through the motor to atmosphere. During the venting process, the poppet valve slowly restores to elevated condition, as the relaxed pressure in the poppet valve chamber 98 permits the clutch spring 26 to expand and return the lower clutch member to re-engaged condition.

FIGS. 12–19 present a modified form of the invention. FIG. 12 shows the invention applied to a stationary tool 125, forming one of a gang of multiple nut-setters. This form of invention includes a motor-clutch housing 126 in which is contained a pneumatically powered motor unit 127, the same as that in FIG. 1 but modified in that its lower rotor shaft end 128 is shorter. This rotor shaft end is fixed axially to an upper member 129 of a two-part clutch so that the upper clutch member rotates as a unit with the rotor of the motor unit.

The undersurface of this upper clutch member is formed with a ring of teeth 131 (FIG. 15) which are normally fully engaged with a complementary ring of teeth 132 formed in a lower clutch member 133. A cylindrical shaft 134 depending axially from the underside of the lower clutch member passes slidably through a spring cup 135 rotatably supported in the inner race of a bearing 136. The outer race of this bearing is mounted in an axially adjustable thick bearing ring 137. The latter has a pair of diametrically opposed peripheral ears 138 (FIGS. 12 and 13) projecting through elongated vertical slots 139 formed in opposite wall areas of the lower part of the housing 126. An internally threaded adjusting collar 141 surrounding the housing threadedly engages the periphery of the ears 138. A coil spring 143 which is loaded between the underside of the lower clutch and the spring cup 135 holds the lower clutch member in axial engagement with the upper clutch member. Rotation of the collar 141 in one direction or the other accordingly serves to axially move the bearing ring 137 and the associated spring cup 135 up or down; the bearing ring being guided in its axial movement by the ears 138 in the slots 139. By this arrangement the spring load on the clutch is increased or decreased according to the direction of movement of the bearing ring. An annular bead at 144 internally of the collar, and the upper ends of the slots 139 serve as opposed limits to the extent of axial adjustment of the bearing ring.

The adjusting collar 141 is adapted to be restrained from axial movement relative to the bearing ring. This restraint is provided by means of a clamp nut 145 at its lower end and by a lock nut 146 at its upper end. When loosened slightly, the lock nut allows adjustment or turning of the collar 141; and when tightened, locks the collar against accidental turning.

Below the spring cup 135 the clutch shaft 134 passes slidably through a guide bushing 140 rotatably supported in a bearing block 147. The latter has a fixed position closing over the lower end of the motor-clutch housing 126. Below the bearing block an elongated straight spline end of the clutch shaft defines a pinion gear 148 which is disposed freely in an opening 149 of a reduction gearing spindle cage 151. The latter has an upper open shaft end 152 supported for rotation in the bearing block 147. Within the spindle cage the pinion gear is drivingly engaged with idler gears 153 supported for rotation in the spindle cage. The idler gears engage a surrounding fixed ring gear 154 of a gear housing section 155, secured to the bearing block 147 by the clamp nut 145.

The lower end of the spindle cage defines a spindle 156. The latter is supported for rotation in a bearing 157 of the gear housing 155, and has a squared drive shank 158 adapted for driving connection with the socket of a nut wrench, not shown.

Pneumatic operating power for driving the rotor is supplied to the tool from a source, not shown, through a three way control valve 159 which connects with a manifold 161. An outlet pipe line 162 from the latter connects through a plug 160 with a poppet valve chamber 163 formed in a rear housing section 164 of the tool. The manifold is provided with a plurality of outlet pipe lines 162', which are connectible with tools, not shown, the same as tool 125. An annular shoulder 165 in this rear housing section is defined by a recessed seat 166 for a poppet valve 167 (FIGS. 12, 14, 15). The seat communicates through an axial opening 168 in a bushing 169 and through radial ports 171 in the latter with an annular collector passage 172. The latter communicates through a valve seat 173 with a second annular passage 174 formed in an air flow block 175. Further passages in the wall of the liner 176 and in the upper end plate 177 connect the second annular passage 174 with the rotor chamber 178. A spring loaded piston or check valve 179 in the air flow block is normally arranged to cover seat 173 so as to cut off pneumatic flow from the annular passage 172 to the passages leading to the rotor chamber.

The poppet valve 167 is normally held elevated from its seat, as in FIG. 12, by means of a cylindrical thrust rod 181 which projects slidably through the body and shaft ends of the rotor. The lower end of the rod abuts a central face area of the lower clutch member 133; and the upper end projects into a vented recess 182 wherein it abuts the bottom end of an elongated cylindrical stem 183 of the poppet valve. This stem has a slide fit in the lower part of bushing 169.

In the operation of this (FIGS. 12–19) form of the invention, after the three-way valve 159 has been manually turned to connect the manifold 161 and associated pipe line 162 with the supply source, as in FIG. 12, air entering the poppet valve chamber 163 flows freely about the poppet valve 167 to the collector passage 172 below where it builds up sufficiently to unseat the spring loaded piston valve 179. Whereupon, operating air flows through the associated passages to power the motor 127. The engaged clutch then rotates with the motor. In this action, because of the spring load 143 and bearing 136, the spring cup 134 is carried about as a unit with the clutch. Rotation of the clutch is transmitted to the spindle 156 and to an associated wrench socket, not shown. When the predetermined torque setting is reached by the latter, the lower clutch member is cammed by the opposing clutch teeth axially out of engagement. The poppet valve assists in this action under pressure of air in the poppet valve chamber and, as the crowns of the clutch teeth approach each other, as in FIGS. 14 and 17, the clutch is partially disengaged and the poppet valve is partially closed, causing a relaxed pressure at the underside of the poppet valve; whereupon, the poppet valve abruptly drops under the greater upper air pressure in the poppet valve chamber to fully closed or seated position, as in FIG. 15. The poppet valve drops a distance to its seat sufficient to cause the thrust rod 181 to thrust the lower clutch member 133 axially clear of the upper clutch member 129 in full separation, as in FIGS. 15 and 18. In this latter movement of the lower clutch member, a snubbing action similar to that described with respect to FIG. 1 occurs as an O-ring 184 about the cylindrical body of the lower clutch member 133 snubs against a conical seat 185 provided about an opening in an annular web 186 of the motor-clutch housing. Continued air pressure upon the upper surface of the poppet valve maintains the latter seated and holds the clutch members in fully disengaged condition. Consequent upon the seating of the poppet valve the air pressure at its underside relaxes, causing the piston valve 179 to automatically restore to closed position. The rotor stops as the pressure air flow is shut off.

The poppet valve continues to be held down upon its seat while the three-way control valve 159 remains in open condition supplying pressure air over the pipe line 162. The tool is restored to normal condition for a repeat operation by manually turning the control valve 159 in the direction of the arrow so as to connect the intake port 187 of the manifold with the vent port 188. As the operator turns the valve 159 toward port 188, air from the supply line is cut off to the manifold. The poppet valve, however, continues to be held seated by the pressure of residual air between the control valve and the poppet valve including the residual air in the manifold, until the intake port 187 of the manifold is connected with the vent port 188. As the latter condition is reached, the poppet valve chamber 163 is vented; whereupon the clutch spring 143 acts, as the air pressure over the poppet valve 167 relaxes, to re-elevate the poppet valve and to re-engage the clutch. The clutch members re-engage without difficulty because of the advantageous form of the clutch teeth 131 and 132. In the enlarged view of FIG. 19, wherein the clutch members are shown partially re-engaged, it is to be noted that the crests or crowns of the teeth are formed with a crown angle at 189 to insure re-engagement of the clutch members prior to starting another cycle. Should the clutch members land on the crown angle of the teeth, the clutch spring 143 will exert a force through the angle which will rotate the motor so as to permit the clutch teeth to come into engagement. The load of the spring 191 on the reseated piston valve 179 is greater than that of the residual air yet unvented from the pipeline 162 and manifold 161, so that this residual air cannot pass through the piston valve to rotate the motor during the time the clutch members are re-engaging.

If desired, the piston valve 179 of FIG. 12 could be incorporated in the tool of FIG. 1.

As earlier mentioned, the tool shown in FIG. 12 is one of a multiple or gang of similar tools; each of these is mounted by a foot flange 192 to a common mounting plate 193, and each is supplied with operating pneumatic power through the common manifold 161. The invention is of particular advantage in gang operations such as this, for when any individual tool 125 has reached its torque setting, the clutch thereof will automatically disengage and the motor will come to rest without affecting the operation of the other tools of the gang. After all of the tools have come to a stop, they may all be simultaneously restored by the operator to normal condition for a repeat operation, by turning the three-way control valve 159 to vent condition; and when the three-way valve is turned to its "on" condition the motors of the several tools of the gang will start simultaneously.

With respect to the tools of both FIGS. 1 and 12, the clutch travels at the same speed as the motor unit, and the driving power of the motor is transmitted through the clutch to the reduction gearing, which in each tool lies below the clutch. This arrangement has advantages over the usual arrangement in which the torque release clutch is at the driven end of the reduction gearing and rotates at a much slower speed than the motor. One advantage is that the torque delivered through the present clutch 44, 49 or 129, 133 at high speed is only a fraction of the torque delivered through the corresponding clutch at low speed in a conventional tool of comparable output, with the result that the present location permits a reduction in the size and weight of the clutch, and causes the clutch to release more quickly and with less wear. Another advantage is that the same clutch without change in size or weight can be used with drive gearing having various load ranges, for example, from 20 foot pounds to 300 foot pounds. For this purpose, it is only necessary for subassemblies such as the adapter 25 in FIG. 1 to be annexed to the lower end of the tool, according to the desired load to be transmitted to the work involved. Another advantage is to permit a reduction in the size and weight of the spring and, therefore, of the poppet valve. This reduction results directly or indirectly from the fact that the axial or camming component of the force transmitted to the lower clutch member 49 or 133, which tends to move it downward against the pressure of spring 26 or 143, and which is directly proportional to the torque transmitted through the clutch, is only a fraction of the axial clutch separating force in the conventional arrangement, whereby a smaller and less powerful spring is required to maintain the clutch in engaged relation for any given predetermined output torque. The use of a smaller and lighter spring, in turn, makes it possible to use a smaller and lighter poppet valve 27 or 167 because the diameter of the valve depends upon the spring load of the clutch and the minimum line pressure at which the tool is operated. For example, if it be assumed that the tool will operate at a minimum of 50 pounds per square inch, the valve must be large enough so that the pressure of 50 pounds per square inch, multiplied by the area in square inches of the top face of the valve, will be greater than the maximum load of the spring and thereby hold it in the position shown in FIG. 9 or FIG. 15.

FIG. 20 presents a further modified form of the clutch arrangement. In this form, the upper clutch member 194 which is splined to the lower stub shaft end 195 of the rotor 196 is provided with roller elements 197 which coact with pockets 198 in the lower clutch member 199 in the manner described with respect to FIG. 1. In this form of the invention there is provided a bushing 201 having a cylindrical head 202 disposed centrally between the opposed faces of the clutch members and having a cylindrical reduced stem 203 which depends with a slide fit into a deep axial recess 204 of the lower clutch member. The thrust rod 205, which is relatively longer than that shown in FIG. 12, passes slidably through the bushing 203 and abuts the bottom of the recess 204. A light spring 206 about the lower end of the thrust rod urges the bushing 203 upwardly to bring the head end 202 of the latter against the underface of the upper clutch member 194.

The bushing 203 serves as a guide and centralizer in the axial movement of the lower clutch member; and the spring 206 serves to cushion the lower clutch member as the latter is restored under the load of the heavy clutch spring 207.

While a few embodiments of the invention have been illustrated and described in detail, it is to be expressly understood that the invention is not limited thereto. Various changes can be made in the design and arrangement of the parts without departing from the spirit and scope of the invention.

What is claimed is:

1. In a rotary power tool including a pneumatically powered rotor, and a spindle, a two-part spring loaded clutch intermediately of the rotor and the spindle drivingly connecting the spindle with the rotor, means for moving one part of the clutch axially relative to the other upon the spindle realizing a predetermined torque load, and other means for responding to such axial movement of the said one part of the clutch to drive the latter clutch part clear of the other part and simultaneously with such action to interrupt pneumatic flow to the rotor.

2. In a rotary power tool including a pneumatically powered rotor, a spindle, and a two-part clutch drivingly connecting the spindle with the rotor, the two-part clutch having a first part fixed to the rotor and having a second part axially disengageable from the first part and drivingly engaging the spindle, a coil spring normally loading the second clutch part into clutched engagement with the first clutch part, means for moving the second clutch part against the spring load axially away from the first clutch part upon the spindle realizing a predetermined torque load, other means for responding to such axial movement of the second clutch part to drive the latter clear of the first clutch part against the spring load and simultaneously with such action to interrupt pneumatic flow to the rotor, and means for holding at will the second clutch part so disengaged and the pneumatic flow to the rotor so interrupted.

3. In a rotary power tool as in claim 2, including a housing in which the rotor and two-part clutch are housed and in which the spring loading the second clutch part is wholly confined, means for adjusting the load of the spring from the outside of the housing, and indicia on the housing readable against such adjustment means as to the degree of adjustment.

4. In a rotary power tool as in claim 2, including a housing for the rotor and clutch, a vertically extending threaded member fixed centrally of the housing, a circular nut threaded upon the threaded member having a broad upper face serving as an end abutment for the spring and having radially extending splines spaced about its periphery; means for threadedly adjusting the nut along the threaded member so as to vary the load of the spring, comprising a barrel member rotatably supported in the housing in surrounding relation to the nut and having vertical straight splines in which the splines of the nut member are engaged and vertically slidable, and key operable gear means supported by the housing for rotating the barrel member.

5. In a rotary power tool including a spindle, a rotary clutch adapted to drive the spindle, the clutch comprising a driving member and a driven member, spring loaded into engagement with the latter, the driven member having a slidable splined driving engagement with the spindle and adapted to disengage axially against the spring load from the driving member in the direction of the spindle upon realizing a predetermined torque load; pneumatically loaded ram means separate from the driven member and abutting the latter for axially and drivingly following under its pneumatic load the driven member in such disengaging action and restraining the driven member from becoming re-engaged under the spring load.

6. In a pneumatically powered rotary tool having a housing including a pneumatically powered rotary driving clutch jaw, a driven clutch jaw adapted for connection with a tool spindle and spring loaded into clutched engagement with the driving clutch jaw, and a passage for supplying pneumatic operating fluid to the driving clutch jaw, wherein the driven jaw is adapted to automatically move axially out of clutched engagement under overload; slidably supported ram rod means including a broad valve head at one end controlling pneumatic flow through said passage, the ram rod means being at its other end in axial abutment with the driven jaw and the valve head being normally unseated above the passage, the valve head being subject to pressure of pneumatic fluid flowing to said passage so that the ram means including the valve head are adapted to slidably follow disengaging movement of the driven jaw, and means about the passage co-operable with the broad valve head to materially reduce pneumatic flow through the passage as the valve head approaches a certain position short of seating over the passage, in which certain position the driven jaw is partially disengaged from the driving jaw, and in which certain position a differential pressure is caused to suddenly build up above the broad valve head sufficient to actuate the latter to seated position and to thrust by means of the ram rod means the driven jaw clear of the driving jaw.

7. In combination, a spindle, a torque transmitting two-part rotary clutch of the cam toothed type having a driving and a driven member wherein one member is axially camable out of engagement from the other, and wherein the camable member has a slidable driving connection with the spindle and when being disengaged moves axially in the direction of the spindle a spring holding the disengageable member in clutched engagement with the other, an air piston abutting the disengageable member in opposed relation to the spring having a large surface subject to pressure air exerting through the piston an opposing force greater than that of the spring, and the piston having a smaller surface normally subject to pressure air exerting thereover a force in opposition to that provided over the large surface and supplementing that of the spring to provide a resultant force overpowering that provided over the large surface, cam surface means between the clutch members exerting a force upon the disengageable member tending to disengage the latter axially against the force of the spring under overload, and means responsive to partial disengagement of the disengageable member to substantially reduce the air pressure per unit area over the smaller surface thereby causing the piston under pressure of air acting over the larger surface to overpower the spring to drivingly follow the disengageable member out of engagement in the direction of the spindle.

8. In a torque transmitting tool including a housing, a pneumatically powered rotary motor therein, a driving clutch element fixed to the motor, a driven work clutch element, a spring loading the latter into clutched engagement with the driving element, the driven element being adapted to disengage axially from the driving element upon being overloaded, and a pressure air inlet chamber in the housing having an opening at one end to allow pressure air flow to operate the motor; the combination of a disc poppet valve in the chamber adapted to seat over the opening so as to interrupt pressure air flow to the motor, slide rod means abutting the driving clutch at one end and normally supporting the poppet valve at the other end in a position clear of the opening and at a distance above the latter greater than the depth of engagement of the driving and driven elements; the poppet valve being subject to pressure air flow to the opening so as to follow upon the slide rod means the driven element in a direction towards the opening as the driven element disengages; and means cooperable with the poppet valve after a movement of the latter over a predetermined partial distance towards the opening to cause a differential pressure to suddenly develop upstream of the poppet valve relatively greater than the opposing load of the spring, whereupon the poppet valve is caused to abruptly move the balance of the way to its seat and in doing so cause the slide rod means to thrust the driven element clear of the driving element against the load of the spring.

9. In a torque transmitting tool as in claim 8, wherein means is provided for snubbing the seating action of the poppet valve so as to prevent rebounding of the driven element under the load of the spring.

10. In a torque transmitting tool as in claim 9, wherein the snubbing means comprises a fixed support transversely of the interior of the housing having a conical seat about an axial opening therein, an annular shoulder about the driven member adapted to move into the opening as the driven member is thrust out of engagement, and an O-ring about the shoulder adapted to seat upon the conical seat and to become lightly wedged between the seat and the shoulder as the driven member is thrust out of engagement.

11. In a torque transmitting tool as in claim 8, wherein the spring is wholly confined within the housing, means is provided for adjusting the load of the spring from the outside, and external visible means is provided for reading the degree of adjustment.

12. In a torque transmitting tool as in claim 8, wherein control means is provided for cutting off the supply of pressure air to the inlet chamber and for venting the latter.

13. In a torque transmitting tool as in claim 12, wherein the control means comprises a manipulative valve for cutting off the supply of pressure air, and a restricted port in the poppet valve communicating the inlet chamber with a vent to atmosphere.

14. In a torque transmitting tool as in claim 8, wherein the driven clutch element has a ring of arcuate pockets in a face thereof and the driving clutch element has a plurality of cylindrical rollers in an opposing face thereof adapted for clutched engagement with the pockets.

15. In a torque transmitting tool as in claim 8, wherein the poppet valve has a stem depending axially thereof, a bushing is provided in the opening at the said end of the inlet having apertures communicating the opening with the motor, and means is provided in a part of the bushing as a guide for sliding movement of the stem of the poppet valve.

16. In a torque transmitting tool as in claim 15, wherein the slide rod means is slidable axially of the motor and is adapted to be frictionally carried about with the motor, the end of the slide rod means supporting the poppet valve projects from the motor into a recess of the housing below the bushing; and wherein bearing cup means is provided connecting the said supporting end of the slide rod means with the free end of the stem of the poppet valve whereby the slide rod means has frictional rotative movement with the motor relative to the poppet valve.

17. In a torque transmitting tool as in claim 15, wherein the driven clutch element has an axial recess therein, and the abutting end of the slide rod means projects from the motor and has a slide fit in the recess enabling the driven clutch element to be guided in its axial movement relative to the driving element.

18. In a torque transmitting tool as in claim 8, wherein means is provided on the housing and on the driven clutch element for detachably associating with the latter and the housing a spindle cage gearing assembly.

19. In a torque transmitting tool the combination comprising a pneumatically powered rotary motor; reduction gearing; a clutch comprising a driving element rotatable with the motor as a unit, a driven element having a sliding spline driving connection with the reduction gearing and a spring loading the driven element into clutched engagement with the driving element, the driven element being adapted to disengage axially from the driving element and to slide axially relative to the reduction gearing against the spring load upon realizing an overload; and means responsive to partial disengagement of the driven element from the driving element to move the driven element axially clear of the driving element and slidably relative to the reduction gearing for a further distance, and to simultaneously interrupt pneumatic operating power to the motor.

20. The combination in a rotary tool of a motor, reduction gearing, a torque control clutch for transmitting the output of the motor to the gearing comprising axially arranged rotatable driving and driven members, the driving member having a slidable splined driving connection with the gearing mounted to the motor and the driven member having a slidable splined driving connection with the gearing, interengaging cam means on said members for transmission of torque between them with an axial component of force tending to separate the member and cause axial travel of the driven member from the driving member in the direction of the gearing, a spring opposing said component of force but yieldable gradually to permit separation, and slide means under constant pneumatic load abutting the driven member and responsive to such separation for drivingly following the driven member out of separation and to so restrain the latter until the pneumatic load is relieved.

21. The combination in a rotary tool of a motor, a reduction gearing assembly for transmitting the torque of the motor to a spindle, a two-part spring loaded clutch drivingly connecting the motor to the gearing, means for moving one part of the clutch axially relative to the other upon the gearing realizing a predetermined torque load, other means for responding to such axial movement of the said one part of the clutch to drive said part clear of the other part and simultaneously with such action to interrupt power to the motor.

22. The combination as in claim 21, wherein means is provided detachably connecting the gearing assembly to the clutch so that the gearing is interchangeable with other gearing assemblies.

23. A torque release and shut-off device for rotary tools, having a rotor, a passage supplying pneumatic pressure fluid to the rotor, a driving jaw clutch member unitary with the rotor, a mating driven clutch member, and a spring loading the latter into clutched engagement with the driving member, wherein cam means is provided between the members whereby the driven member is cammable by the driving member to move out of engagement against the spring load upon experiencing an overload; comprising a ram valve means axially abutting the driven member, the ram valve means controlling flow through the passage and normally raised above a valve seat therein, means for causing the ram valve means under pressure of pneumatic fluid in the passage to follow in the direction of its seat disengaging movement of the driven member to a point where the driven member reaches a predetermined point of partial disengagement and where the valve means is away from its seat a distance slightly greater than the remaining distance required for the driven member to move clear of the driving member, means for creating upon the valve means reaching this point a differential pneumatic pressure above the valve means greater than that below and greater than the load of the spring so as to cause the valve means to abruptly seat to shut off pneumatic flow and to cause the driven member to move clear of the driving member, check valve means in the passage between the said valve seat and the rotor for cutting off pneumatic flow to the rotor when the pressure of pneumatic fluid between the valve means and the rotor has diminished below that above the valve means, and means for cutting off pneumatic flow to the ram valve means and for bleeding off any residual pneumatic pressure fluid above the ram valve means after the valve means has seated.

24. In a rotary power tool having a housing including a pneumatically powered rotary clutch comprising a driving clutch element, a driven work clutch element engageable with the driving element, and a spring yieldably holding the driven element in clutched engagement with the driving element, the driven element being adapted to disengage axially from the driving element against the load of the spring upon realizing an overload, a passage for supplying operating pneumatic fluid to the rotary clutch; and means for exhausting spent air from the rotary clutch, a broad surfaced poppet valve controlling flow through said passage, a seat for the poppet valve about the passage characterized by an annular shoulder raised about the outer diameter of the surface of the seat, the poppet valve having a normal position elevated clear of the seat and the shoulder, slidable rod means normally supporting the poppet valve in its elevated position, the rod having one end abutting the driven clutch element and the other abutting the underside of the poppet valve, the poppet valve being subject to pneumatic fluid flowing to the said passage and under the pressure of such fluid being responsive to follow in the direction of its seat any axial disengagement movement of the driven element, the poppet valve having an axially moved position in close proximity to the said shoulder following partial disengagement of the driven member so as to cause a differential pneumatic pressure to develop above the poppet valve of greater magnitude than that below, and than that of the opposing load of the spring whereupon the poppet valve pops to seated position, and the overall distance of movement of the poppet valve from normal position to its seat being sufficient to carry the driven element clear of the driving element.

25. In a rotary power tool as in claim 24, wherein a spring loaded check valve is arranged in the passage for closing off flow of pressure air beyond the poppet valve to the rotary clutch upon development of a relaxed pressure of air in the passage.

26. In a rotary power tool as in claim 25, wherein manipulative means is provided for cutting off supply of pressure air to the poppet valve and for bleeding off residual air in the passage above the poppet valve.

27. In combination, a gang plate; a plurality of pneumatically powered tools mounted upon the gang plate; each tool having a pneumatically powered rotor, a driving clutch member unitary with the rotor, and a mating driven clutch member disengageable from the driving clutch member; a manipulative pneumatic supply control common to the plurality of tools; a manifold communicating the pneumatic supply control with each tool; means in each tool operable by pressure of pneumatic fluid passing to the rotor thereof to fully disengage the driven member from the driving member upon the latter realizing a predetermined overload and at the same time shut off flow of pneumatic fluid from the manifold to the rotor of that particular tool.

28. In a rotary power tool including a housing having therein a slidable member and a spring yieldably resisting sliding movement of the member, a vertically extending threaded member fixed centrally of the housing, a circular nut threaded upon the threaded member having a broad upper face serving as an end abutment for the spring and having radially extending splines spaced about its periphery; and means for threadedly adjusting the nut along the threaded member so as to vary the load of the spring, comprising a barrel member rotatably supported in the housing in surrounding relation to the nut and having vertical straight splines in which the splines of the nut member are engaged and vertically slidable, and key operable gear means supported by the housing for rotating the barrel member.

29. In a pressure fluid actuated tool for running and setting a threaded element, a rotary fluid motor, a spindle, rotation transmitting clutch means between said motor and spindle automatically releasable upon a predetermined resistance to rotation of said spindle, a normally held open valve means controlling the supply of operating pressure fluid to said motor, means automatically releasing said valve means to interrupt said supply upon release of said clutch means, and means automatically reopening said valve means when the pressure of the fluid falls below a predetermined level.

30. In a pressure fluid actuated tool for running and setting a threaded element, a rotary fluid motor, a spindle, rotation transmitting clutch means between said motor and spindle automatically releasable upon a predetermined resistance to rotation of said spindle, normally held open valve means to supply operating pressure fluid to said motor, means automatically releasing said valve means to interrupt said supply upon release of said clutch means, and means automatically returning said valve means to the held open position when the pressure of the fluid falls below a predetermined level.

31. In a pressure fluid actuated tool for running and setting a threaded element, a rotary fluid motor, a spindle, rotation transmitting clutch means between said motor and spindle automatically releasable upon a predetermined resistance to rotation of said spindle, a normally held open valve means controlling the supply of operating pressure fluid to said motor, means automatically releasing said valve means to close said supply upon release of said clutch means, and spring means automatically reopening said valve means when the pressure of the fluid falls below a predetermined level.

32. In a pressure fluid actuated tool for running and setting a threaded element, a rotary fluid motor, a spindle, rotation transmitting clutch means between said motor and spindle automatically releasable upon a predetermined resistance to rotation of said spindle, a normally held open valve means controlling the supply of operating pressure fluid to said motor, means to release said valve upon release of said clutch means, pneumatic means automatically closing said valve means to interrupt said supply when said valve is released, and means automatically opening said valve means when the pressure of the fluid falls below a predetermined level.

33. In a pressure fluid actuated tool for running and setting a threaded element, a rotary motor, a spindle, rotation transmitting clutch means between said motor and spindle automatically releasable upon a predetermined resistance to rotation of said spindle, means forming a passageway to supply motive fluid to said motor, a normally open valve in said passageway, means adapted to hold the valve in said open position, and adapted to become disabled in response to said clutch release to so hold said valve, the valve being adapted to be closed by the pressure fluid when said holding means is disabled.

34. In a rotary power tool for running a threaded fastener, a pneumatically powered rotary motor, a work spindle, rotary clutch means drivingly connecting the motor with the spindle automatically releasable upon realizing a predetermined resistance to rotation of the spindle, valve means normally restrained in open condition controlling flow of operating air to the motor, means automatically releasing the valve means to block the flow of said operating air to the motor upon release of the clutch means, and means automatically reopening the valve means when the pressure of the operating air over the valve means falls below a predetermined degree.

35. In a rotary power tool for running a threaded fastener, a pneumatically powered rotary motor, a work spindle, rotary clutch means drivingly connecting the motor with the spindle automatically releasable upon realizing a predetermined resistance to rotation of the spindle, valve means normally restrained in open condition controlling flow of operating air to the motor, means automatically releasing the valve means to closed condition upon release of the clutch means, and means automatically returning the valve means to its normally restrained open condition when the pressure of the operating air over the valve means falls below a predetermined degree.

36. In a rotary power tool for running a threaded fastener, a pneumatically powered rotary motor, a work spindle, rotary clutch means drivingly connecting the motor with the spindle automatically releasable upon realizing a predetermined resistance to rotation of the spindle, slide valve means normally restrained in open condition controlling flow of operating air to the motor, means automatically releasing the valve means to block the flow of operating air to the motor upon release of the clutch means, and spring means automatically restoring the valve means to open condition when the pressure of operating air over the valve means falls below a predetermined degree.

37. In a rotary power tool for running a threaded fastener, a pneumatically powered rotary motor, a work spindle, rotary clutch means drivingly connecting the motor with the spindle automatically releasable upon realizing a predetermined resistance to rotation of the spindle, slide valve means controlling flow of operating air to the motor normally restrained in open condition, pneumatic means automatically closing the valve means to block off flow of operating air to the motor when the valve means is unrestrained, and means automatically opening the valve means when the pressure of operating air over the valve means falls below a predetermined degree.

38. The combination in a rotary tool of a rotary motor, a spindle, a two-part spring loaded clutch drivingly connecting the motor to the spindle, means for moving one part of the clutch axially relative to the other upon the spindle realizing a predetermined torque load, other means for responding to such axial movement of the said one part of the clutch to drive said part clear of the other part and simultaneously with such action to interrupt power to the motor.

39. A torque release clutch comprising coaxial driving and driven clutch members having cam means therebetween for imparting torque with an axial component of force tending to separate the members, spring means constantly urging the driven member axially toward the driving member, fluid pressure means constantly urging the driven member axially away from the driving member, the holding force of the spring being normally greater than the disengaging force of the fluid pressure means thereby holding the clutch members fully engaged under relatively low torque, the clutch members being adapted to be partially separated in response to a predetermined torque when the spring force is overcome by the combined fluid and camming forces, and means responsive to such partial separation for increasing the fluid force to overpower the spring force independently of the camming force, thereby separating the driven member completely from the driving member.

40. A rotary power tool comprising a housing; a clutch in said housing, said clutch comprising coaxial driving and driven clutch members, the driving member being held against axial movement relative to the housing, the driven clutch member being in front of the driving member and being movable forward and rearward for disengagement and re-engagement respectively with the driving member, spring means in front of the driven member for urging the latter toward engaging position; a rotary air motor in said housing having a driving connection with the clutch driving member; a passageway for supplying pressure fluid to the motor; a slide valve for controlling the flow of air through said passageway, said valve being positioned to the rear of the clutch and being arranged to reciprocate along the axis of rotation of the clutch, said valve being arranged to reduce or shut off the supply of live air to the motor upon forward movement of the valve; and slide rod means interposed between the valve and the driven clutch member, and arranged to move the latter forward in opposition to the spring upon forward movement of the valve, thereby disengaging the clutch simultaneously with the stopping of the motor.

41. A rotary power tool comprising a housing; a clutch in said housing, said clutch comprising coaxial driving and driven clutch members having cam means therebetween for imparting torque with an axial component of force tending to separate the members, the driving member being held against axial movement relative to the housing, the driven clutch member being in front of the driving member and being movable forward and rearward for disengagement and re-engagement respectively with the driving member, spring means in front of the driven member for urging the latter toward engaging position; a rotary motor in said housing having a driving connection with the clutch driving member; a piston located to the rear of the clutch and being arranged to reciprocate along the axis of rotation of the clutch, said piston being moved forward by live air; and slide rod means interposed between the piston and the driven clutch member, and arranged to move the latter forward in opposition to the spring upon forward movement of the piston whereby the clutch is disengaged by the combined effects of the camming force and fluid pressure; and manually controlled means for cutting off the supply of live air to the piston, thus permitting said spring means to return the driven clutch member to re-engaged position and simultaneously to move the piston rearward.

42. A rotary power tool according to claim 41 which includes a passageway for supplying live air to the motor, and in which the piston is located in said passageway, said piston being ararnged to restrict the flow of live air through the passageway upon forward movement of the piston.

43. In combination, a plurality of rotary tools, each tool having a pneumatically powered motor, a driving clutch member driven by the motor, and a mating driven clutch member partially separable from the driving clutch member in response to a predetermined torque load; a throttle valve common to the plurality of tools; a manifold communicating the throttle valve with each tool to supply pressure fluid thereto; and means in each tool operable by pressure of pneumatic fluid passing to the motor thereof to fully disengage the driven member from the driving member in response to a partial separation, said disengaging means being effective to hold the clutch members completely disengaged as long as the throttle valve is open.

References Cited by the Examiner

UNITED STATES PATENTS

| | | | |
|---|---|---|---|
| 2,050,910 | 8/1936 | Zancan | 192—56 |
| 2,683,512 | 7/1954 | Boice | 192—56 |
| 2,700,443 | 1/1955 | Boice | 192—56 |
| 2,768,546 | 10/1956 | Amtsberg | 81—52.4 X |
| 2,796,789 | 6/1957 | Rice et al. | 192—56 |
| 2,807,972 | 10/1957 | Mitchell | 144—32 |
| 2,964,151 | 12/1960 | Eckman | 192—.03 X |
| 2,973,068 | 2/1961 | Sturrock | 192—.03 X |
| 2,986,052 | 5/1961 | Eckman et al. | 192—150 |

DAVID J. WILLIAMOWSKY, *Primary Examiner.*